US011531751B2

(12) United States Patent
Caklovic (10) Patent No.: US 11,531,751 B2
(45) Date of Patent: *Dec. 20, 2022

(54) SOFTWARE INTEGRITY CHECKING SYSTEMS AND METHODS

(71) Applicant: Intertrust Technologies Corporation, Milpitas, CA (US)

(72) Inventor: Marko Caklovic, Palo Alto, CA (US)

(73) Assignee: Intertrust Technologies Corporation, Milpitas, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/112,612

(22) Filed: Dec. 4, 2020

(65) Prior Publication Data

US 2021/0089646 A1    Mar. 25, 2021

Related U.S. Application Data

(63) Continuation of application No. 16/670,701, filed on Oct. 31, 2019, now Pat. No. 10,872,146, which is a continuation of application No. 15/452,319, filed on Mar. 7, 2017, now Pat. No. 10,496,814.

(60) Provisional application No. 62/304,771, filed on Mar. 7, 2016.

(51) Int. Cl.
| G06F 21/54 | (2013.01) |
| G06F 21/51 | (2013.01) |
| G06F 21/64 | (2013.01) |
| G06F 21/57 | (2013.01) |

(52) U.S. Cl.
CPC .............. *G06F 21/54* (2013.01); *G06F 21/51* (2013.01); *G06F 21/57* (2013.01); *G06F 21/64* (2013.01); *G06F 2221/033* (2013.01)

(58) Field of Classification Search
CPC ....................................................... G06F 21/54
See application file for complete search history.

(56) References Cited

U.S. PATENT DOCUMENTS

| 5,359,659 | A | * | 10/1994 | Rosenthal | ............. | G06F 21/564 726/24 |
| 5,598,530 | A | * | 1/1997 | Nagae | ................... | G06F 21/565 714/21 |
| 5,978,484 | A | * | 11/1999 | Apperson | ............. | G06F 21/125 713/170 |
| 6,006,328 | A | * | 12/1999 | Drake | ................. | H04L 63/0428 713/188 |
| 6,195,587 | B1 | * | 2/2001 | Hruska | ................. | G06F 21/565 726/17 |

(Continued)

*Primary Examiner* — Ponnoreay Pich
(74) *Attorney, Agent, or Firm* — Finnegan, Henderson, Farabow, Garrett & Dunner, LLP (57) ABSTRACT

This disclosure relates to systems and methods generating and distributing protected software applications. In certain embodiments, integrity checking mechanisms may be implemented using integrity checking code in software code prior to compilation into machine code. Following compilation and execution of the application, the introduced code may check the integrity of the application by determining whether the application behaves and/or otherwise functions as expected. By introducing integrity checking in this manner, integrity checking techniques may be injected into the application prior to compilation into machine code and/or independent of the particular manner in which the application is compiled.

21 Claims, 5 Drawing Sheets

(56) References Cited

U.S. PATENT DOCUMENTS

| | | | | |
|---|---|---|---|---|
| 7,757,284 B1* | 7/2010 | Viljoen | .................... | G06F 21/57 |
| | | | | 380/1 |
| 10,496,814 B2* | 12/2019 | Caklovic | .................. | G06F 21/54 |
| 10,872,146 B2* | 12/2020 | Caklovic | .................. | G06F 21/57 |
| 2002/0038428 A1* | 3/2002 | Safa | ...................... | G06F 21/125 |
| | | | | 713/190 |
| 2002/0138748 A1* | 9/2002 | Hung | ...................... | G06F 21/64 |
| | | | | 713/190 |
| 2003/0023856 A1* | 1/2003 | Horne | .................... | G06F 3/064 |
| | | | | 726/26 |
| 2003/0159036 A1* | 8/2003 | Walmsley | ............. | H04L 9/0662 |
| | | | | 713/168 |
| 2003/0188231 A1* | 10/2003 | Cronce | .................. | G06F 21/51 |
| | | | | 713/165 |
| 2003/0191942 A1* | 10/2003 | Sinha | ...................... | G06F 21/52 |
| | | | | 713/181 |
| 2008/0140537 A1* | 6/2008 | Powell | ................ | G06Q 30/0601 |
| | | | | 705/26.1 |
| 2008/0276314 A1* | 11/2008 | Wollnik | ................. | G06F 21/51 |
| | | | | 726/22 |
| 2009/0172814 A1* | 7/2009 | Khosravi | ................ | G06F 21/54 |
| | | | | 726/23 |
| 2016/0094552 A1* | 3/2016 | Durham | ................. | G06F 21/00 |
| | | | | 713/171 |
| 2016/0132667 A1* | 5/2016 | Freitas Fortuna dos Santos | ........ | |
| | | | | H04L 9/14 |
| | | | | 713/189 |
| 2017/0006057 A1* | 1/2017 | Perez Lafuente | ....... | H04L 67/34 |
| 2021/0089646 A1* | 3/2021 | Caklovic | ................. | G06F 21/54 |

* cited by examiner

SOFTWARE INTEGRITY CHECKING SYSTEMS AND METHODS

RELATED APPLICATIONS

This application is a continuation of U.S. application Ser. No. 16/670,701, filed Oct. 31, 2019, which is a continuation of U.S. application Ser. No. 15/452,319, filed Mar. 7, 2017 (now U.S. Pat. No. 10,496,814), and claims the benefit of priority under 35 U.S.C. § 119(e) to U.S. Provisional Application No. 62/304,771, filed Mar. 7, 2016, all of which are titled "SOFTWARE INTEGRITY CHECKING SYSTEMS AND METHODS," and all of which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for generating and distributing secure and/or otherwise protected software applications. More specifically, but not exclusively, the present disclosure relates to systems and methods that use software integrity checking techniques in connection with generating and distributing secure and/or otherwise protected software applications.

Software applications, including mobile software applications, may be targeted in a variety of attacks. For example, mobile software applications may be targeted in man-at-the-end attacks—attacks against mobile applications from device—resident malware. Attackers may further attempt to modify a mobile software application, introducing code that may, among other things, compromise the security of personal information associated with a user. Maintaining mobile application security may be important to a variety of value chain stakeholders, including device users and other transaction participants.

Systems and methods disclosed herein may use integrity checking techniques and methods to improve the security of software applications including mobile software applications. Embodiments of the disclosed systems and methods may, among other things, introduce software integrity checking mechanisms using integrity checking code and/or the like included in software code (e.g., source code and/or intermediate code) prior to compilation into machine code. In certain embodiments, following compilation and execution of the application, the introduced code may check the integrity of the application and/or various portions thereof by determining that the application and/or portions thereof behave and/or otherwise function as expected. For example, the introduced code may determine that the inputs and/or outputs of the application and/or portions thereof act as expected. By using integrity checking stub code in this manner, integrity checking techniques may be introduced into the application prior to compilation into machine code and/or independent of the particular manner in which the application is compiled.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the systems and methods disclosed herein may use integrity checking techniques and methods to improve the security of software applications including mobile software applications. Software integrity checking mechanisms may be introduced in software code (e.g., source code and/or intermediate representation code) prior to compilation into machine code. In some embodiments, such mechanisms may verify the integrity of an application by analyzing the behavior and/or functionality of the application and/or portions thereof relative to an expected behavior. Embodiments disclosed herein may enable software integrity checking that is not necessarily dependent on the particular manner in which an application is compiled.

In certain embodiments, a mobile software application may be generated by an application developer system. Although embodiments disclosed herein are discussed in connection with mobile software applications, it will be appreciated that the disclosed embodiments may be used in connection with any other suitable type of software application, including software applications that are not necessarily intended to be executed on mobile devices.

In some embodiments, a generated mobile software application may be uploaded by the developer system to an application store system for distribution to one or more mobile devices. The application store system may require that certain build processes be performed by the application store system rather than the application developer prior to distribution of the application to mobile devices. For example, the application store system may require that the application developer provide the store system with source code, application bit code (e.g., low level virtual machine ("LLVM") bit code), and/or any other intermediate representation of the application code rather than compiled machine code. Certain integrity checking techniques, however, may require knowledge of the specific compilation process used to compile the application into executable machine code to function properly. Accordingly, it may be difficult for a developer to include integrity checking mechanisms in software that is later compiled by the application store system in some unknown way.

Figure 1:
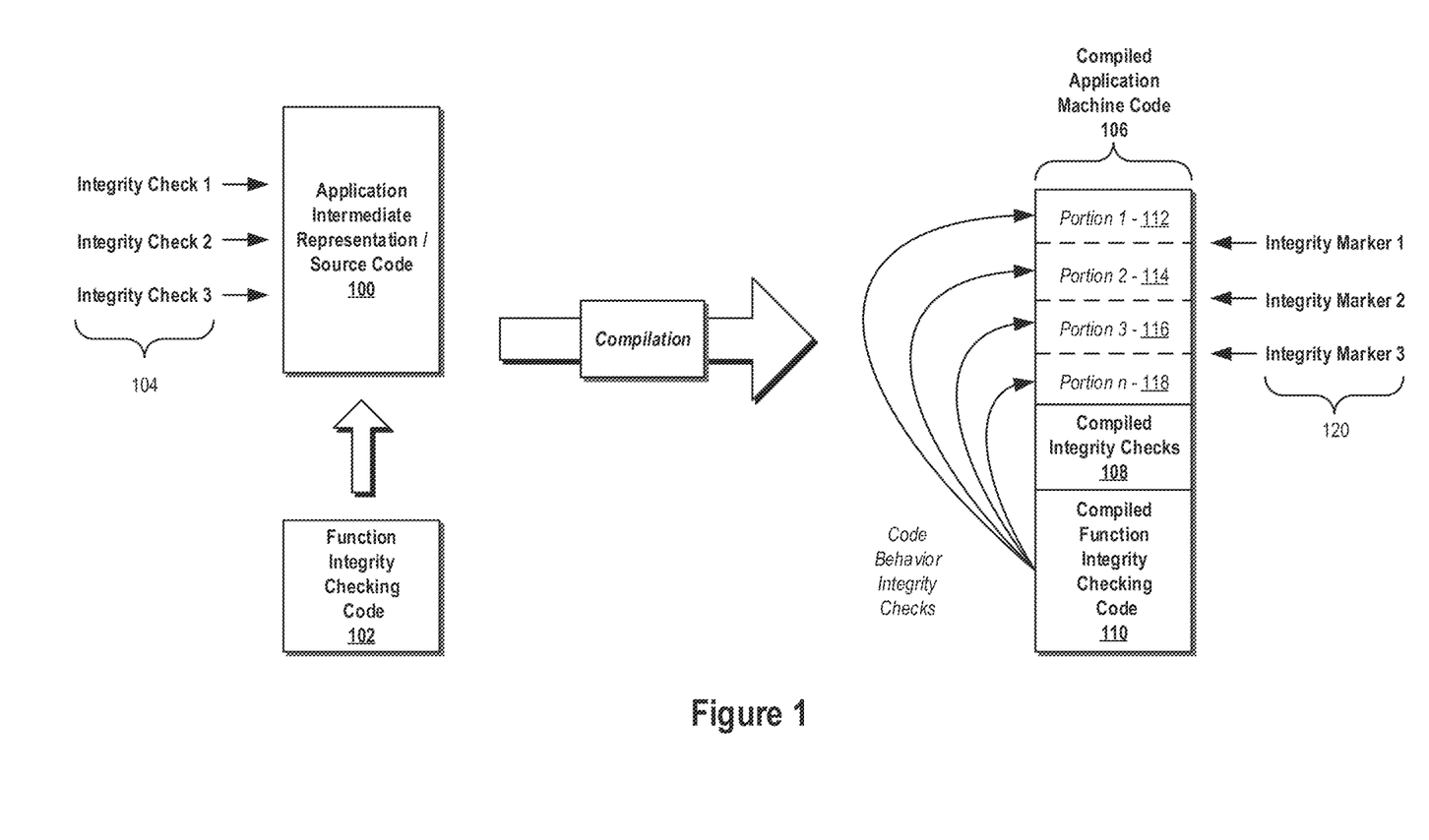
FIG. 1 illustrates a conceptual diagram of a software integrity checking method consistent with embodiments of the present disclosure.

Embodiments of the disclosed integrity checking mechanisms may allow for integrity checking code to be included in a software application that remains effective regardless of the manner in which the application is compiled into machine code. FIG. 1 illustrates a conceptual diagram of a software integrity checking method consistent with embodiments of the present disclosure. As shown, function integrity checking code 102 may be inserted as stub code included in source code, application bit code (e.g., LLVM bit code), and/or any other intermediate representation code of the application 100.

In some embodiments, the function integrity checking code 102 may be appended to the associated application code 100, although other possible insertion locations may also be used in connection with the disclosed embodiments. For example, function integrity checking code 102 may be injected in any suitable location of the application code 100 including, without limitation, in a single section of the application code 100 and/or in multiple locations and/or sections of the application code 100. In certain embodiments, the function integrity checking code 102 may be included in the application code 100 in such a manner that obfuscates and/or otherwise makes it difficult to identify the inserted code 102.

In some embodiments, a variety of code obfuscation techniques may be used in connection with injecting and/or transforming function integrity checking code 102 and/or other integrity checking code disclosed herein. Such techniques may, among other things, may it difficult to identify where the various integrity checking code has been injected in the application code 100 and/or hinder analysis of the code. For example, in some embodiments, control flow flattening techniques may be used to break and flatten the structure of a control flow graph associated with program code (e.g., complicating decompilation of the code). In further embodiments, junk code may be inserted in the application code 100 and/or injected integrity checking code. For example, code may be inserted that does not necessarily execute but nevertheless complicates static analysis of the code. In yet further embodiments, constant encryption may be used to encrypt and/or otherwise protect constant defined values or arrays in the application code 100 and/or injected integrity checking code. It will be appreciated that a variety of code obfuscations techniques may be used and that any suitable code obfuscation methods may be implemented in connection with the disclosed systems and methods.

In certain embodiments, one or more additional integrity checks 104 may be inserted into the source and/or intermediate representation application code 100. In some embodiments, the additional integrity checks 104 may, among other things, be configured to check the integrity of the compiled application machine code 106 at execution to determine whether the application machine code 106 has been tampered with and/or otherwise modified. For example, as discussed in more detail below, in certain embodiments, the additional integrity checks 104 may determine whether one or more portions of the application machine code 106 have been modified by comparing the application machine code 106 and/or portions thereof against one or more integrity values and/or markers 120 inserted in the application machine code 106 (e.g., using a hash comparison integrity check and/or the like). In some embodiments, the additional integrity checks 104 may implement integrity verification checking mechanisms that are relatively faster and/or less computationally intensive than the behavior verification integrity checking mechanisms implemented by the function integrity checking code 102.

After insertion of the function integrity checking code 102 and/or the integrity checks 104 into the source and/or intermediate representation application code 100, the resulting protected application code may be compiled to generate associated application machine code 106. As discussed in more detail below, in some embodiments, the protected application code may be transmitted to and compiled by a third party system, such as an application store system and/or the like. In some embodiments, the function integrity checking code 102 and/or the integrity checks 104 may be written such that their functionality is preserved regardless of the particular compilation process used.

In certain embodiments, when the application machine code 106 executes, the compiled function integrity checking code 110 may be initialized. In some embodiments, the compiled function integrity checking code 110 may be configured to execute prior to the rest of the application machine code 106. The function integrity checking code 110 may, among other things, test the application and/or portions thereof before the application 106 is executed to ensure that the application and/or portions thereof 112-118 function and/or otherwise behave as expected. For example, the function integrity checking code 110 may determine that the inputs and/or outputs of the application 106 and/or portions thereof 112-118 behave as expected. Similarly, the function integrity checking code 110 may examine various function and/or resource calls to and/or from the application 106 and/or portions thereof 112-118 to determine whether the application 106 and/or its constituent portions 112-118 function and/or behave as expected. In some embodiments, the function integrity checking code 110 may examine the function and/or behavior of the application 106 basic block by basic block.

If the function integrity checking code 110 determines that the application 106 and/or its constituent portions 112-118 do not behave as expected, the application 106 has potentially been tampered with. Accordingly, the function integrity checking code 110 may engage in at least one protective action. For example, the function integrity checking code 110 may prevent the further execution of the application 106, impose certain conditions and/or limitations on the execution of the application 106 (e.g., limiting to the application 106 to certain function calls, execution within a protected space, etc.), provide an indication to an application developer and/or other interested services that the application 106 has potentially been tampered with, and/or the like. It will be appreciated that a variety of protective actions may be used and that any suitable protective action may be implemented in connection with the disclosed systems and methods.

If the function integrity checking code 110 determines that the application 106 and/or its constituent portions 112-118 behave as expected 112-118, it may be determined that that the application 106 has likely not been tampered. Accordingly, the application 106 may be allowed to execute. In some embodiments, for auditing purposes, an indication may be sent to an application developer and/or other interested services indicating that the application 106 has likely not been tampered with.

As discussed above, in some embodiments, the function integrity checking code 110 may be configured to divide the application 106 into a plurality of portions 112-118 and verify the function and/or behavior of each of the plurality of portions 112-118 in lieu of and/or in addition to the entire application 106. In certain embodiments, dividing code behavior integrity checking operations based on the plurality of portions 112-118 of the application 106 may increase the efficiency and/or accuracy of such integrity check operations.

In some embodiments, certain portions 112-118 of the application may be checked by the function integrity checking code 110 while other portions 112-118 of the application may not have their function and/or behavior checked. For example, in certain embodiments, portions of the application 112-118 that are sensitive and/or relatively secure (e.g., application code that accesses and/or otherwise operates on sensitive information such as personal information, cryptographic information, and/or the like) may have their function and/or behavior checked by the function integrity checking code 110, while other less sensitive and/or secure portions 112-118 may not. In some embodiments, performing integrity checking operations in connection with portions of the application 112-118 deemed sensitive may increase the efficiency and/or speed of the integrity check operation relative to checking the integrity of the entire application 106.

Integrity checking consistent with the disclosed embodiments may be performed at a variety of suitable times. For example, an integrity check operation consistent with embodiments disclosed herein may be performed at installation of an application on a device 106, when the application 106 is first initialized and/or executed, and/or at any other suitable time.

In some embodiments, after successfully verifying the integrity of the application 106 based on analyzing the function and/or behavior of the application 106 and/or portions thereof 112-118, the integrity checking stub code may generate, insert, and/or store one or more integrity values or markers 120 into the compiled machine code of the application 106 and/or in one or more other locations (e.g., in a secure storage space of an associated device). In certain embodiments, the one or more integrity markers 120 may comprise one or more hash values calculated based on the application machine code 106 and/or associated portions thereof 112-118. In some embodiments, after generation, the one or more integrity markers 120 may be stored in a secure execution space of an associated system or device, thereby preserving the integrity of the integrity markers 120 in the event the application machine code 106 is tampered with.

The generated integrity markers 120 may be used in connection with a hash comparison integrity check to ensure the application machine code 106 has not been tampered with. For example, in some embodiments, one or more compiled integrity checks 108 may be configured to check the integrity of the complied application code 106 and/or associated portions 112-118 by calculating hash value(s) from the application code 106 and/or associated portions 112-118 and comparing the calculated hash value(s) with the previously generated integrity markers 120. In some embodiments, the integrity checking implemented by the integrity checks 108 using the generated integrity markers 120 may be relatively faster and/or less computationally intensive than the function and/or behavior verification integrity checking mechanisms implemented by the function integrity checking code 110. Accordingly, the integrity checking implemented by the integrity checks 108 using the generated integrity markers 120 may be used following the initial behavior verification integrity check performed by the function integrity checking code 110 to more efficiently check the integrity of the application 106.

As discussed above, in some embodiments, one or more integrity checks 104 may be inserted into the source and/or intermediate representation application code 100 in addition to the inserted function integrity checking code 102 (e.g., by a developer and/or the like). In further embodiments, the compiled function integrity checking code 110 may, after successfully performing a function and/or behavior checking integrity verification, insert one or more compiled integrity checks into 108 the compiled application machine code 106. That is, in lieu of and/or in addition to being inserted by a developer of the application into the source and/or intermediate representation application code 100, integrity checks 108 implementing hash value integrity checking against one or more integrity markers 120 may be inserted into the application machine code 106 when the function integrity checking code 110 is executed.

It will be appreciated that a number of variations can be made to the architecture, relationships, and examples presented in connection with FIG. 1 within the scope of the inventive body of work. For example, certain steps and/or processes described above may be performed by a single device and/or system and/or any suitable combination of devices and/or systems in any suitable configuration. Thus it will be appreciated that the architecture, relationships, and examples presented in connection with FIG. 1 are provided for purposes of illustration and explanation, and not limitation.

Figure 2:
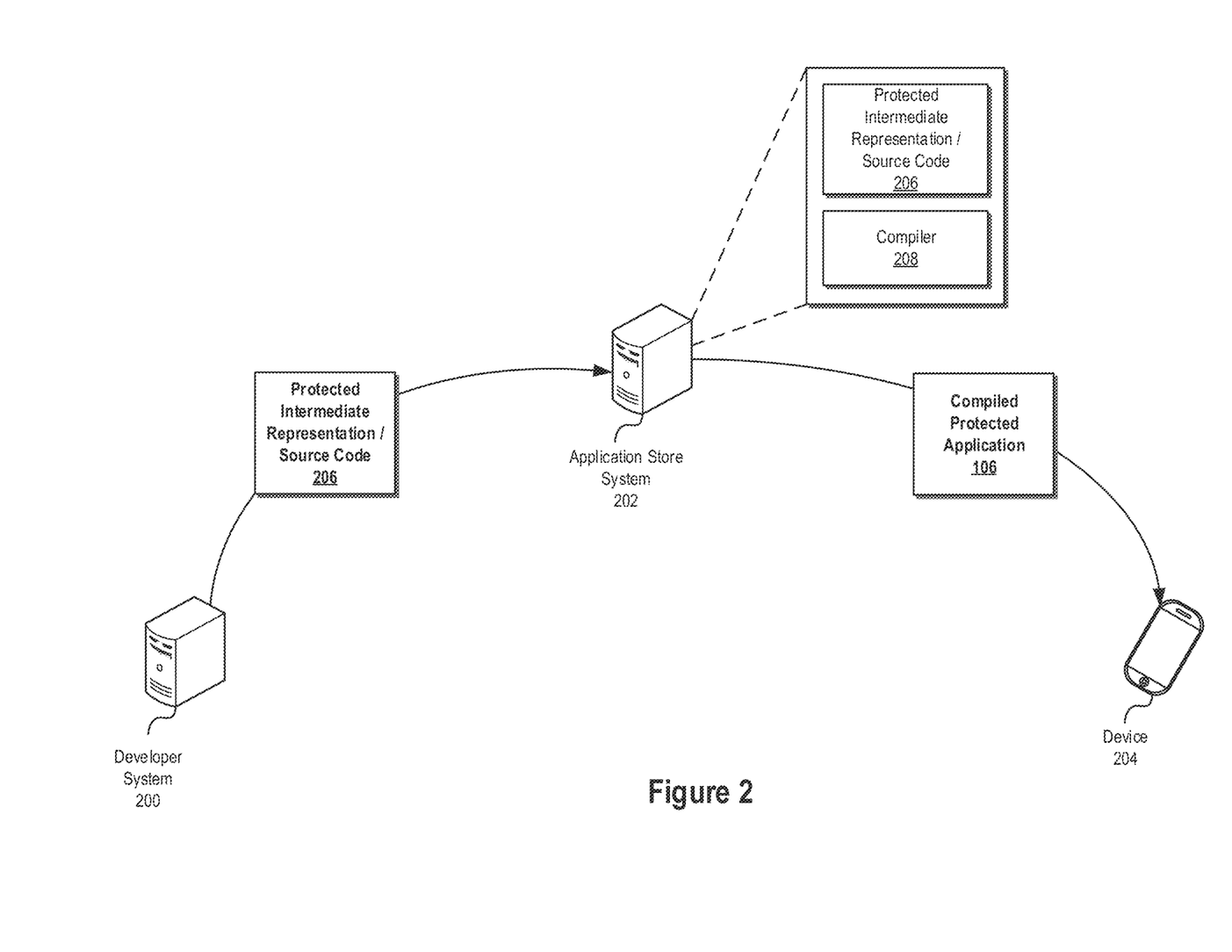
FIG. 2 illustrates generation and distribution of a protected software application consistent with embodiments of the present disclosure.

FIG. 2 illustrates generation and distribution of a protected software application 106 consistent with embodiments of the present disclosure. In certain embodiments, a variety of connected systems and/or devices 200-204 may be used in connection with the generation and distribution of a protected software application 106. For example, various aspects of the disclosed embodiments may be implemented using a developer system 200, an application store system 202, and/or a user system or device 204.

The systems and/or devices 200-204 and/or one or more other systems and/or services may comprise a variety of computing devices and/or systems, including any computing system or systems suitable to implement embodiments of the various systems and methods disclosed herein. The connected devices and/or systems 200-204 may comprise a variety of computing devices and systems, including laptop computer systems, desktop computer systems, server computer systems, distributed computer systems, smartphones, tablet computers, vehicle computer systems (e.g., vehicle media and navigation systems and/or the like), streaming media systems, wearable computing devices (e.g., smartwatches, etc.), and/or the like.

In certain embodiments, the systems and/or devices 200-204 may comprise at least one processor system configured to execute instructions stored on an associated non-transitory computer-readable storage medium. As discussed in more detail below, the systems and/or devices 200-204 may further comprise a secure processing unit ("SPU") configured to perform sensitive operations such as trusted signature operations, integrity checking code and/or marker generation, secure hash generation, and/or other aspects of the systems and methods disclosed herein. The systems and/or devices 200-204 may further comprise software and/or hardware configured to enable electronic communication of information between the devices and/or systems 200-204 via one or more associated network connections of a network.

The systems and/or devices 200-204 and/or one or more other systems and/or services may be communicatively coupled using a variety of networks and/or network connections. In certain embodiments, the network may comprise a variety of network communication devices and/or channels and may utilize any suitable communications protocols and/or standards facilitating communication between the trusted service, user device, and/or one or more other systems and/or services.

The network may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 104 may incorporate one or more satellite communication links. In yet further embodiments, the network may utilize IEEE's 802.11 standards, Bluetooth®, ultra-wide band ("UWB"), Zigbee, and/or any other suitable standard or standards.

Consistent with embodiments of the disclosed systems and methods, a developer system 200 may generate protected source and/or intermediate representation application code 206 and transmit the protected source and/or intermediate representation application code 206 to an application store system 202. As discussed above, the protected source and/or intermediate representation code 206 may comprise source and/or intermediate representation code for an application that includes function integrity checking code and/or additional integrity checks (e.g., hash value integrity checks and/or or the like).

The application store system 202 may compile the protected source and/or intermediate representation code 206 using a compilation engine 208, and may distribute the compiled protected application 106 to one or more end-user devices 204. By including function and/or behavior integrity checking code in the application prior to compilation as part of the protected source and/or intermediate representation code 206, the developer system 200 may ensure that the application 106 includes operative integrity checking regardless of the manner in which the application 106 is compiled into machine code by the application store system 202.

Figure 3:
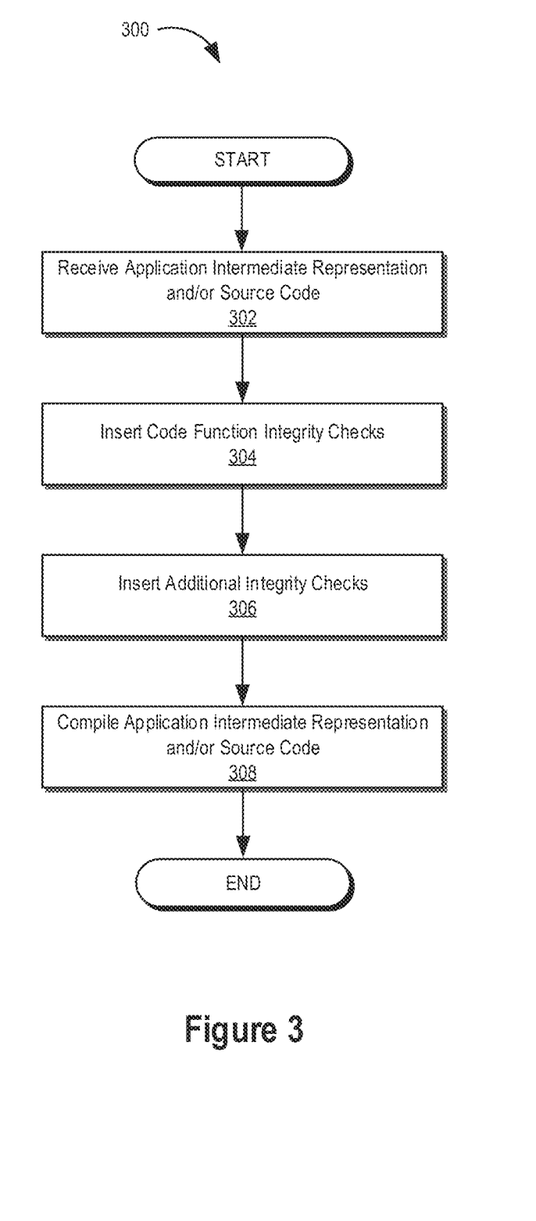
FIG. 3 illustrates a flow chart of an exemplary method for generating a protected software application consistent with embodiments of the present disclosure.

FIG. 3 illustrates a flow chart of an exemplary method 300 for generating a protected software application consistent with embodiments of the present disclosure. The illustrated method 300 may be implemented in a variety of ways, including using software, firmware, hardware, and/or any combination thereof. In certain embodiments, the method 300 may be implemented by a system associated with an application developer as described above.

At 302, source and/or intermediate representation code associated with an application may be received and/or otherwise generated by a developer system. At 304, function and/or behavior integrity checking code may be inserted into the source and/or intermediate representation code in one or more locations. As discussed above, the function and/or behavior integrity checking code may, among other things, be configured to test the application and/or portions thereof before the application is executed to ensure that the application and/or its constituent portions function and/or otherwise behave as expected. For example, the function and/or behavior integrity checking code may determine that the inputs and/or outputs of the application and/or portions thereof behave as expected. It will be appreciated that the function and/or behavior of an application may be tested in a variety of ways, and that any suitable method for implementing code function and/or behavior integrity checking may be used in connection with the disclosed embodiments.

Additional integrity checks may be inserted into one or more locations of the source and/or intermediate representation application code at 306. In some embodiments, the additional integrity checks may be configured to check the integrity of the compiled application code at execution to determine whether the application code has been tampered with and/or otherwise modified. For example, in certain embodiments, the additional inserted integrity checks may be configured to determine whether one or more portions of the application code have been modified by comparing the application code and/or portions thereof against one or more one or more integrity values and/or markers (e.g., via a hash comparison check and/or the like). The various integrity checking code inserted at 304 and/or 306 may be included in the source and/or intermediate representation code in a single location or in multiple locations. In addition, in some embodiments, the integrity checking code inserted at 304 and/or 306 may further be inserted in the application in such a manner that obfuscates and/or otherwise makes it difficult to identify the inserted code.

At 308, the source and/or intermediate representation application code with the integrity checking code inserted at 304 and/or 306 may be compiled into machine executable code. In some embodiments, the source and/or intermediate representation application code may be compiled by a developer system. In further embodiments, a developer system may transmit the source and/or intermediate representation application code with the inserted integrity checking code to an application store system for compilation and distribution to one or more end user devices.

Figure 4:
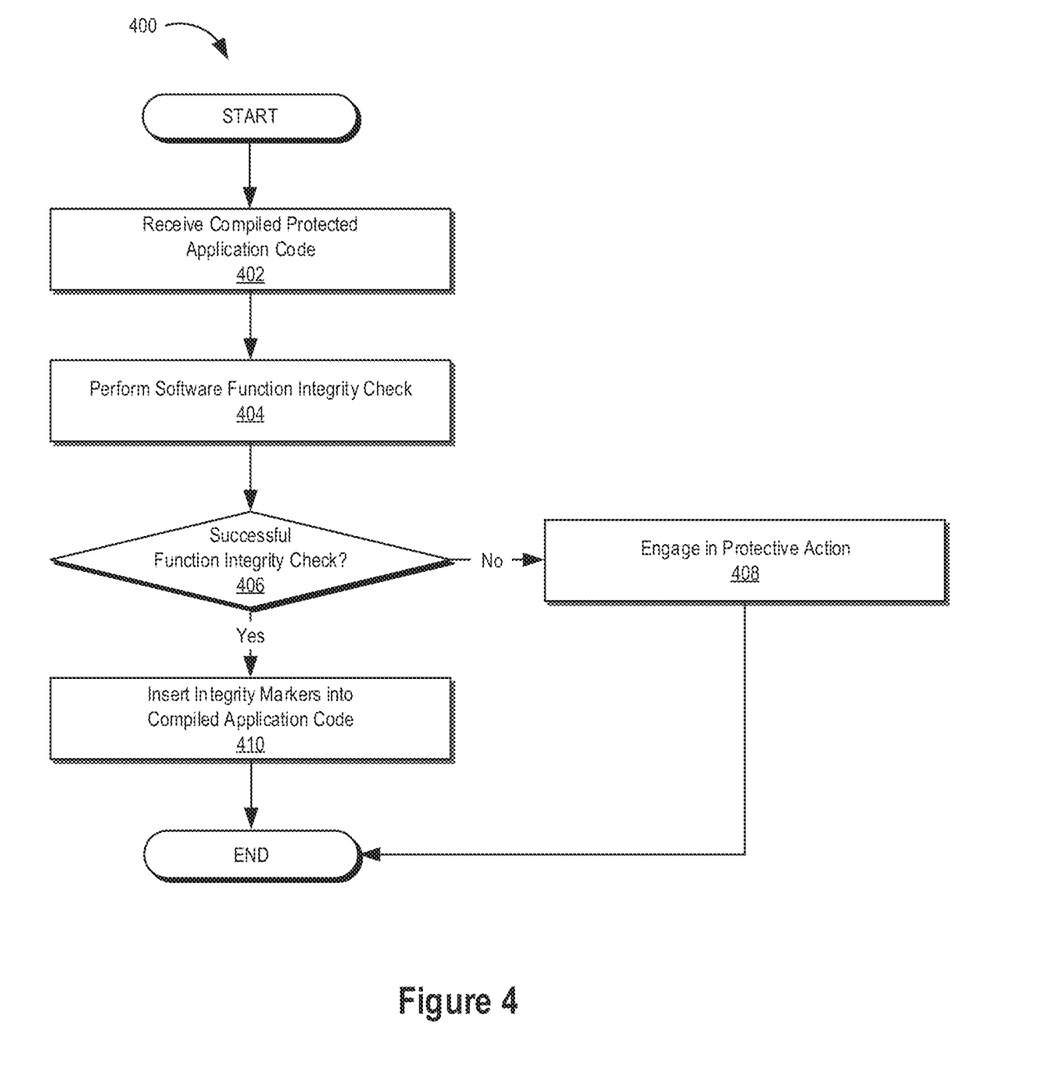
FIG. 4 illustrates a flow chart of an exemplary method for verifying the integrity of a protected software application consistent with embodiments of the present disclosure.

FIG. 4 illustrates a flow chart of an exemplary method 400 for verifying the integrity of a protected software application consistent with embodiments of the present disclosure. The illustrated method 400 may be implemented in a variety of ways, including using software, firmware, hardware, and/or any combination thereof. In certain embodiments, the method 400 may be implemented by a user device executing a protected application.

At 402, the user device may receive executable application machine code protected using embodiments of the disclosed systems and methods. Function integrity checking code included in the application at 404 may, among other things, test the application and/or portions thereof before the application is executed to ensure that the application and/or its constituent portions function and/or otherwise behave as expected. For example, the function checking code may determine that the inputs and/or outputs of the application and/or portions thereof behave as expected, may examine various function and/or resource calls to and/or from the application and/or portions thereof, and/or the like to determine whether the application and/or its constituent portions function and/or behave as expected.

If at 406 the function integrity checking code determines that the application and/or its constituent portions do not behave as expected and/or that the application has potentially been tampered with, the method 400 may proceed to 408 where the integrity checking code may implement at least one protective action. For example, the function integrity checking code may prevent the further execution of the application, impose certain conditions and/or limitations on the execution of the application, provide an indication to an application developer and/or other interested services that the application has potentially been tampered with, and/or the like.

If at 406 the function integrity checking code determines that the application and/or its constituent portions behave as expected and/or that the application has likely not been tampered with, the method 400 may proceed to 410. At 410, the integrity checking code may generate, insert, and/or store one or more integrity values or markers into the application code and/or in one or more other locations of the user device. In certain embodiments, the one or more integrity markers may comprise one or more hash values calculated based on the application code and/or portions thereof. As discussed above, the generated integrity markers may be used in connection with a hash comparison integrity check to ensure the application machine code has not been tampered with during subsequent execution of the application.

Figure 5:
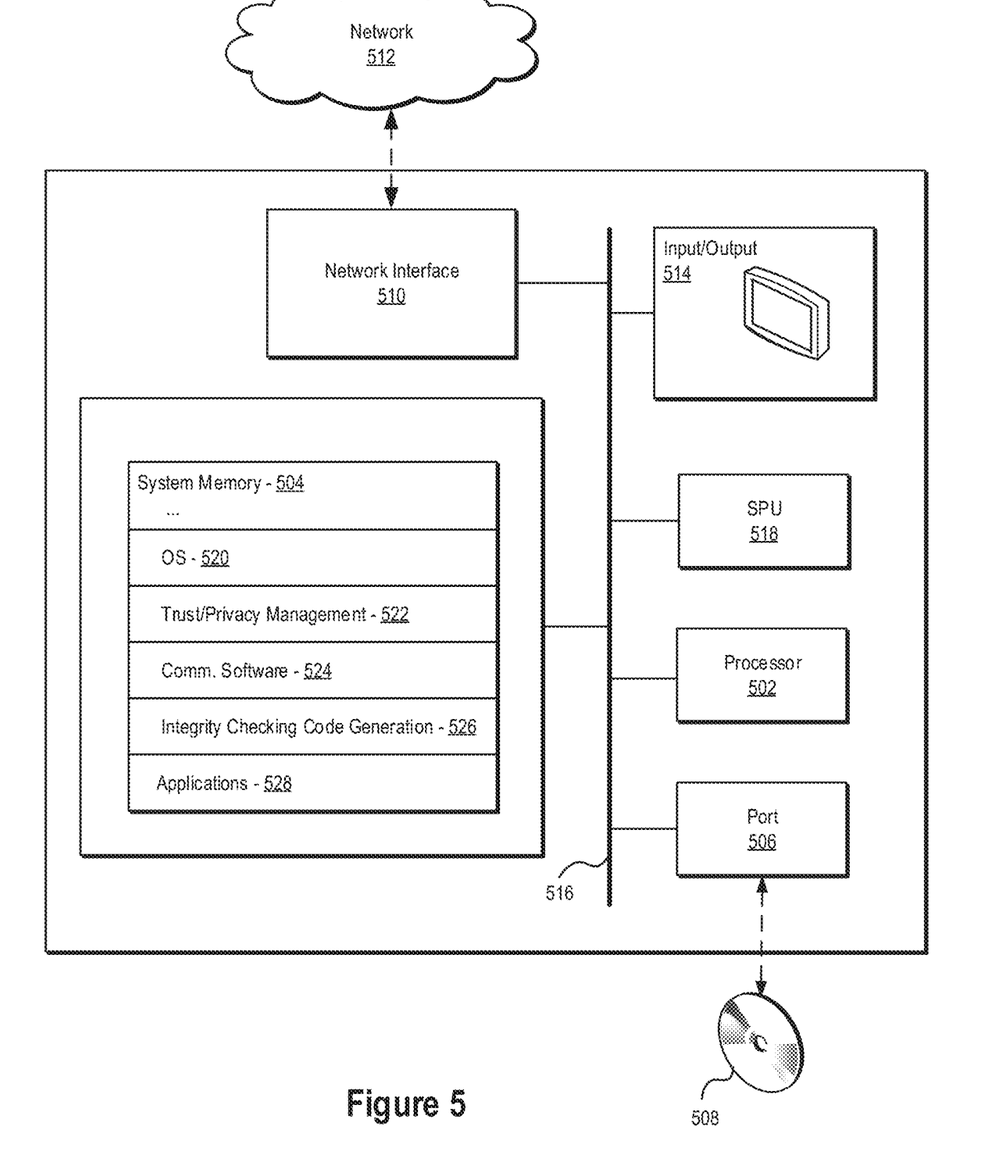
FIG. 5 illustrates an exemplary system that may be used to implement embodiments of the systems and methods of the present disclosure.

FIG. 5 illustrates an exemplary system 500 that may be used to implement embodiments of the systems and methods of the present disclosure. Certain elements associated with the illustrated exemplary system 500 may be included in one or more developer systems, application store systems, user devices, and/or any other system configured to implement various aspects of embodiments of the disclosed systems and methods. As illustrated in FIG. 5, the system 500 may include: a processing unit 502; system memory 504, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 502; a port 506 for interfacing with removable memory 508 that may include one or more diskettes, optical storage mediums, and/or other non-transitory computer-readable storage mediums (e.g., flash memory, thumb drives, USB dongles, compact discs, DVDs, etc.); a network interface 510 for communicating with other systems via one or more network connections 512 using one or more communication technologies; a user interface 514 that may include a display and/or one or more input/output devices such as, for example, a touchscreen, a keyboard, a mouse, a track pad, and the like; and one or more busses 516 for communicatively coupling the elements of the system.

In some embodiments, the system may, alternatively or in addition, include an SPU 518 that is protected from tampering by a user of the system or other entities by utilizing secure physical and/or virtual security techniques. An SPU 518 can help enhance the security of sensitive operations such as personal information management, trusted credential and/or key management, secure hash generation, code obfuscation, privacy and policy management, and other aspects of the systems and methods disclosed herein. In certain embodiments, the SPU 518 may operate in a logically secure processing domain and be configured to protect and operate on secret information, as described herein. In some embodiments, the SPU 518 may include internal memory storing executable instructions or programs configured to enable the SPU 518 to perform secure operations, as described herein.

The operation of the system 500 may be generally controlled by the processing unit 502 and/or the SPU 518 operating by executing software instructions and programs stored in the system memory 504 (and/or other computer-readable media, such as removable memory 508). The system memory 504 may store a variety of executable programs or modules for controlling the operation of the system. For example, the system memory may include an operating system ("OS") 520 that may manage and coordinate, at least in part, system hardware resources and provide for common services for execution of various applications and a trust and privacy management engine 522 for implementing trust and privacy management functionality including protection and/or management of sensitive data through management and/or enforcement of associated policies. The system memory may further include, without limitation, communication software 524 configured to enable in part communication with and by the system; one or more applications 528; an integrity checking code generation and insertion engine configured to perform various aspects of the disclosed embodiments including, for example, generation of function and/or behavior checking code, generation of additional integrity checking code (e.g., hash verification code), insertion and/or obfuscation of various integrity checking code into an application, and/or the like; and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for protecting an application performed by a system comprising a processor and a non-transitory computer-readable medium storing instructions that, when executed by the processor, cause the system to perform the method, the method comprising:
    generating functional integrity checking code, the functional integrity checking code being configured to execute one or more functional integrity checks of the application to verify that at least a portion of the application associated with the one or more functional integrity checks function according to a defined behavior by verifying that one or more resource calls associated with the at least a portion of the application correspond with an expected resource call behavior;
    inserting the functional integrity checking code into code associated with the application;
    inserting integrity check value generation code into the code associated with the application;
    inserting integrity checking code configured to verify the integrity of the application into the code associated with the application; and
    compiling the code associated with the application including the inserted functionality integrity checking code, the inserted integrity check value generation code, and the inserted integrity checking code,
    wherein the functional integrity checking code is further configured to initiate the integrity check value generation code upon successful verification that the one or more resource calls associated with the at least a portion of the application correspond with the expected resource call behavior.

2. The method of claim 1, wherein the one or more resource calls comprise one or more function calls and the expected resource call behavior comprises an expected function call behavior.

3. The method of claim 1, wherein the one or more functional integrity checks are configured to execute in response to an initial execution of the application.

4. The method of claim 1, wherein the one or more functional integrity checks are configured to execute in response to an installation of the application.

5. The method of claim 1, wherein inserting the functional integrity checking code into the code associated with the application comprises appending the functional integrity checking code into the code associated with the application.

6. The method of claim 1, wherein inserting the functional integrity checking code into the code associated with the application comprises injecting the functional integrity checking code into a plurality of locations in the code associated with the application.

7. The method of claim 1, wherein the functional integrity checking code is at least in part obfuscated.

8. The method of claim 1, wherein the integrity check value generation code is at least in part obfuscated.

9. The method of claim 1, wherein the integrity checking code is at least in part obfuscated.

10. The method of claim 1, wherein the integrity check value generation code is configured to generate one or more first integrity check values based on one or more portions of the application.

11. The method of claim 10, wherein the integrity check value generation code is further configured to store the one or more first integrity check values in a secure storage space of a user device executing the application.

12. The method of claim 10, wherein the integrity check value generation code is further configured to insert the one or more first integrity check values in one or more locations of the application.

13. The method of claim 10, wherein the integrity check value generation code is configured to generate the one or more first integrity check values by performing an operation on at least one portion of the one or more portions of the application.

14. The method of claim 13, wherein the operation comprises a hashing operation and the one or more first integrity check values comprise one or more hash values.

15. The method of claim 10, wherein the integrity checking code is configured to execute in response to an execution of the application following installation of the application on a user device.

16. The method of claim 15, wherein the integrity checking code is configured to perform one or more comparison integrity checks.

17. The method of claim 16, wherein the one or more comparison integrity checks comprise generating one or more second integrity check values based on the one or more portions of the application.

18. The method of claim 17, wherein the one or more comparison integrity checks further comprise determining that the one or more second integrity check values match corresponding values of the one or more first integrity check values.

19. The method of claim 18, wherein the integrity checking code is configured to allow the execution of the application based on determining that the one or more second integrity check values match corresponding values of the one or more first integrity check values.

20. The method of claim 1, wherein the code associated with the application comprises an intermediate representation of the application.

21. The method of claim 1, wherein compiling the code associated with the application including the inserted functionality integrity checking code, the inserted integrity check value generation code, and the inserted integrity checking code comprises transmitting the code associated with the application including the inserted functionality integrity checking code, the inserted integrity check value generation code, and the inserted integrity checking code to an application store system for compilation by the application store system.

* * * * *